United States Patent [19]
Jurisich

[11] 3,887,418
[45] June 3, 1975

[54] HONEYCOMB PRODUCT AND PROCESS FOR MANUFACTURE

[76] Inventor: Peter J. Jurisich, 4731 Royce Rd., Irvine, Calif. 92664

[22] Filed: May 14, 1973

[21] Appl. No.: 360,106

[52] U.S. Cl. .................... 156/197; 161/68; 161/135
[51] Int. Cl. .............................................. B31d 3/02
[58] Field of Search ......... 161/68, 69, 135; 156/197

[56] References Cited
UNITED STATES PATENTS

| | | | |
|---|---|---|---|
| 2,608,502 | 8/1952 | Merriman | 156/197 |
| 3,227,600 | 1/1966 | Holland | 161/68 |
| 3,342,666 | 9/1967 | Hull | 161/135 |
| 3,483,070 | 12/1969 | Kennedy et al. | 156/197 |

*Primary Examiner*—George F. Lesmes
*Assistant Examiner*—P. Thibodeau

[57] ABSTRACT

A process for the continuous production of low density honeycomb cores for use in lightweight sandwich panels and laminates. Thin webs of structural web material, for example, aluminum foil or kraft paper are first corrugated forming crest and trough areas, followed by the application of adhesive coatings, for example, to the outer surface of the crests and the outer surface of the troughs of layers of the corrugated webs. The layers are then stacked one upon another so as to alternate an adhesive coated corrugated web with an uncoated corrugated web. Heat and/or pressure is then applied to the stack to effect bonding of the stacked material. Expansion of the stack, as by pulling the outer webs of the bonded stack, produces a low density honeycomb core. If desired, prior to expansion, the compressed bonded stack of corrugated webs can be machined precisely into complicated shapes and still maintain the desired shape after expansion in the planes parallel to the layers.

8 Claims, 12 Drawing Figures

3,887,418

PATENTED JUN 3 1975

SHEET 2

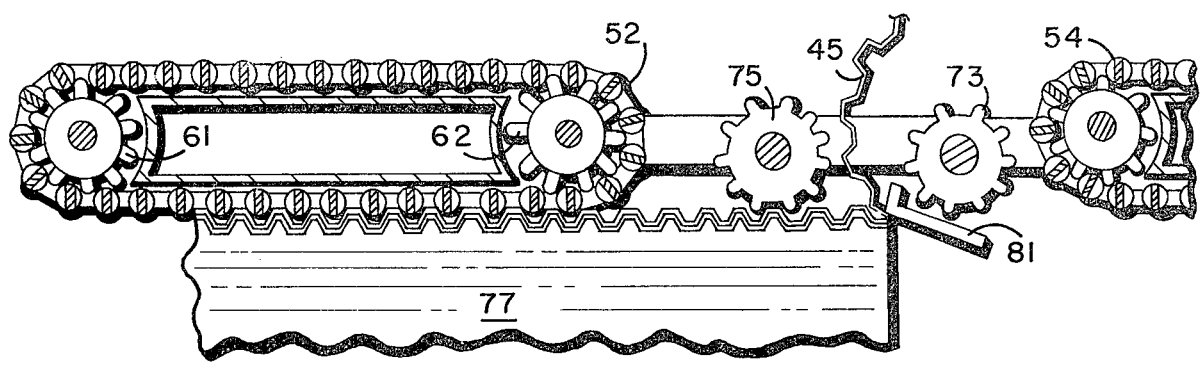
FIG. 12
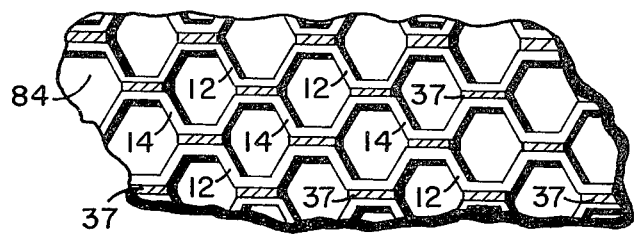
FIG. 7
FIG. 4
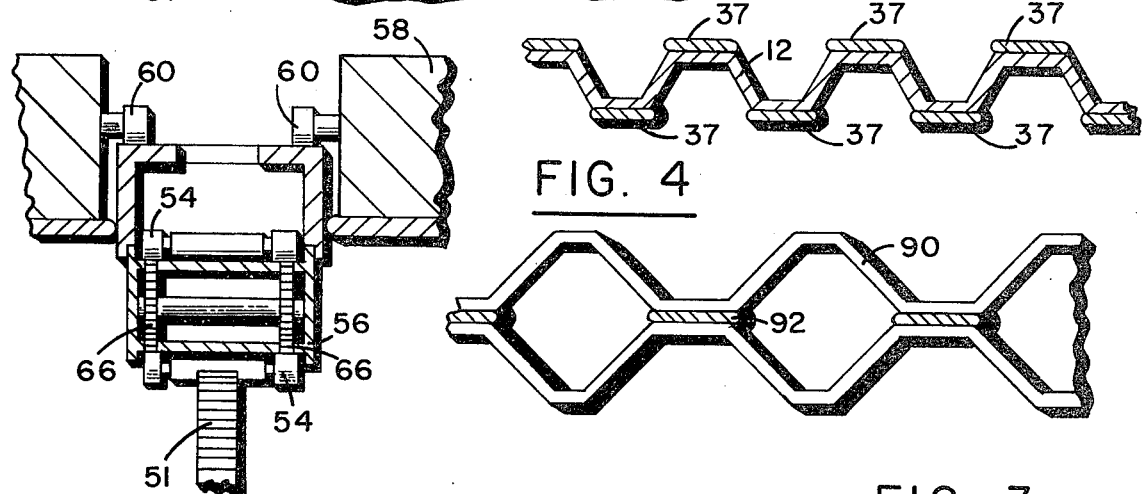
FIG. 3
FIG. 5
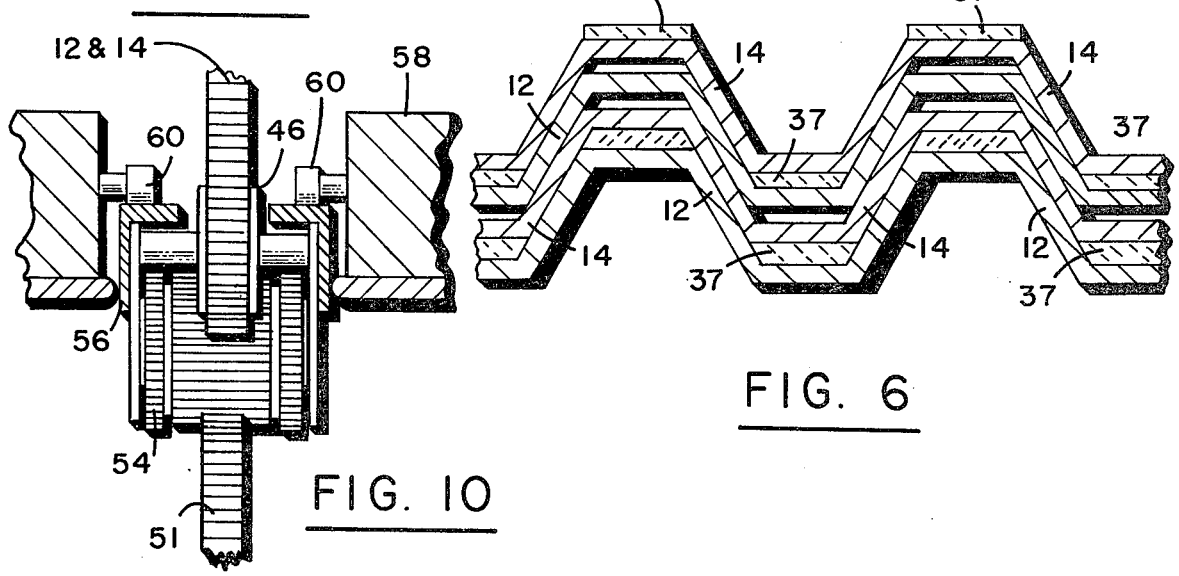
FIG. 6
FIG. 10

HONEYCOMB PRODUCT AND PROCESS FOR MANUFACTURE

BACKGROUND OF THE INVENTION

1. Field of the Invention

This invention relates to structural panels and particularly to lightweight sandwich panels which are useful in aircraft construction and other applications where strong, lightweight structures and precise shapes are required.

2. Description of the Prior Art

Typically, sandwich panels are comprised of an interior, relatively thick, low density core of honeycomb structure, and at least one exterior, relatively thin, dense surface or facing sheet adhered to one or both sides of the honeycomb core.

The honeycomb core is generally comprised of hexagonal-shaped cells usually formed from thin, often fibrous material, such as woven and non-woven textiles, paper, and occasionally foils, such as aluminum foil.

Several methods are commonly used for the manufacture of honeycomb cores. According to one method, the web is first corrugated and coated with adhesive on the crest created by the corrugations, and then stacked so that the crests are touching, thereby forming the cellular structure. Light pressure and heat are then applied to cure the adhesive and form the finished honeycomb cellular structure.

The disadvantages of this method are that it is suitable only for very stiff and heavy web materials for which there is little market at the present time. Furthermore, only very light pressure can be applied and it is difficult to maintain an accurate alignment of the bond areas. As a consequence, the method is not suited to automated production.

According to an alternative method, the web material is first adhesive coated in predetermined areas, followed by forming a flat stack of the adhesive coated webs to be heat pressed to bond the webs together. The final honeycomb configuration is then produced from the flat slab by expansion.

The final expansion of the bonded flat slab produces a contraction of approximately four to three in the planes parallel to the original flat form of the webs. Such contraction is a particular disadvantage when precise product size in complicated shapes is desired, such as for air foil sections. Also, continuous automated production by this method is very difficult because of the contraction effect mentioned above.

SUMMARY OF THE INVENTION

The instant invention is suited to continuous automated production and at the same time produces honeycomb cores which can be precisely machined to an exact configuration. The process permits the application of high pressure to bond areas.

According to the invention, lengths of web material are first corrugated to form crest and trough areas. Next, the extreme outer surface of the crests and the extreme outer surface of the troughs of alternate layers of the corrugated webs are then coated with adhesive, followed by alternately stacking together the adhesive coated and uncoated corrugated webs. The webs are stacked together so as to nest the crests of the corrugated webs one inside another. Heat and pressure are then applied to the stack to cure the adhesive and bond the stacked material together. The resulting bonded stack is in a compact form suitable for shipping. When it is desired to use the honeycomb core, the bonded stack is expanded to form honeycomb cells.

Various methods can be used to expand the bonded stack and form the finished honeycomb in a continuous stream. According to one method, the bonded stack is expanded by passing the bonded stack through two pairs of continuous gripping belts, each pair moving at a different rate of speed. As will be later explained in greater detail, one of the pairs of gripping belts moves at a much greater speed than the other pair of gripping belts. This condition restrains the bonded stacked material at one end and pulls at the other end resulting in expansion of the stack.

The invention permits corrugation of the webs and stacking them to the desired pitch length which is the distance between crests, and to the desired crest bond width to avoid contraction or expansion in the planes parallel to the crests of the webs. Thus, very precise shapes can be cut from the bonded stack prior to expansion and then expanded to the desired shape. This last advantage together with the continuous automated manufacture of the honeycomb by the instant invention results in substantially lower cost over other methods of manufacture. As an example, the considerable expense of machining honeycomb for helicopter blades is greatly reduced by using the instant invention.

It should be noted also that the finished honeycomb core formed by expansion of the bonded stack can also be cut to the desired size for immediate use.

DETAILED DESCRIPTION OF THE INVENTION

Brief Description of the Drawings

The invention will be more clearly understood by reference to the description below taken in connection with the accompanying drawings wherein:

FIG. 3 shows an enlarged cross-section of a honeycomb cell configuration which can be produced according to the invention method;

FIG. 4 shows an enlarged detailed view of the corrugated and coated web as indicated at 4 in FIG. 1;

FIG. 5 shows a cross-section of the bonded stacked corrugated webs and movable carriage assembly as shown along the lines 5—5 of FIG. 1;

FIG. 6 shows a schematic cross-section of the stacked corrugated webs taken generally along lines 6—6 of FIG. 2; FIG. 7 shows an enlarged cross-section of the finished honeycomb formed by expansion of the bonded, stacked, corrugated material, taken along lines 7—7 of FIG. 2;

FIG. 10 shows an enlarged cross-section of the movable carriage assembly taken along lines 10—10 of FIG. 8;

DESCRIPTION OF THE PREFERRED EMBODIMENTS

Figures 1, 8:
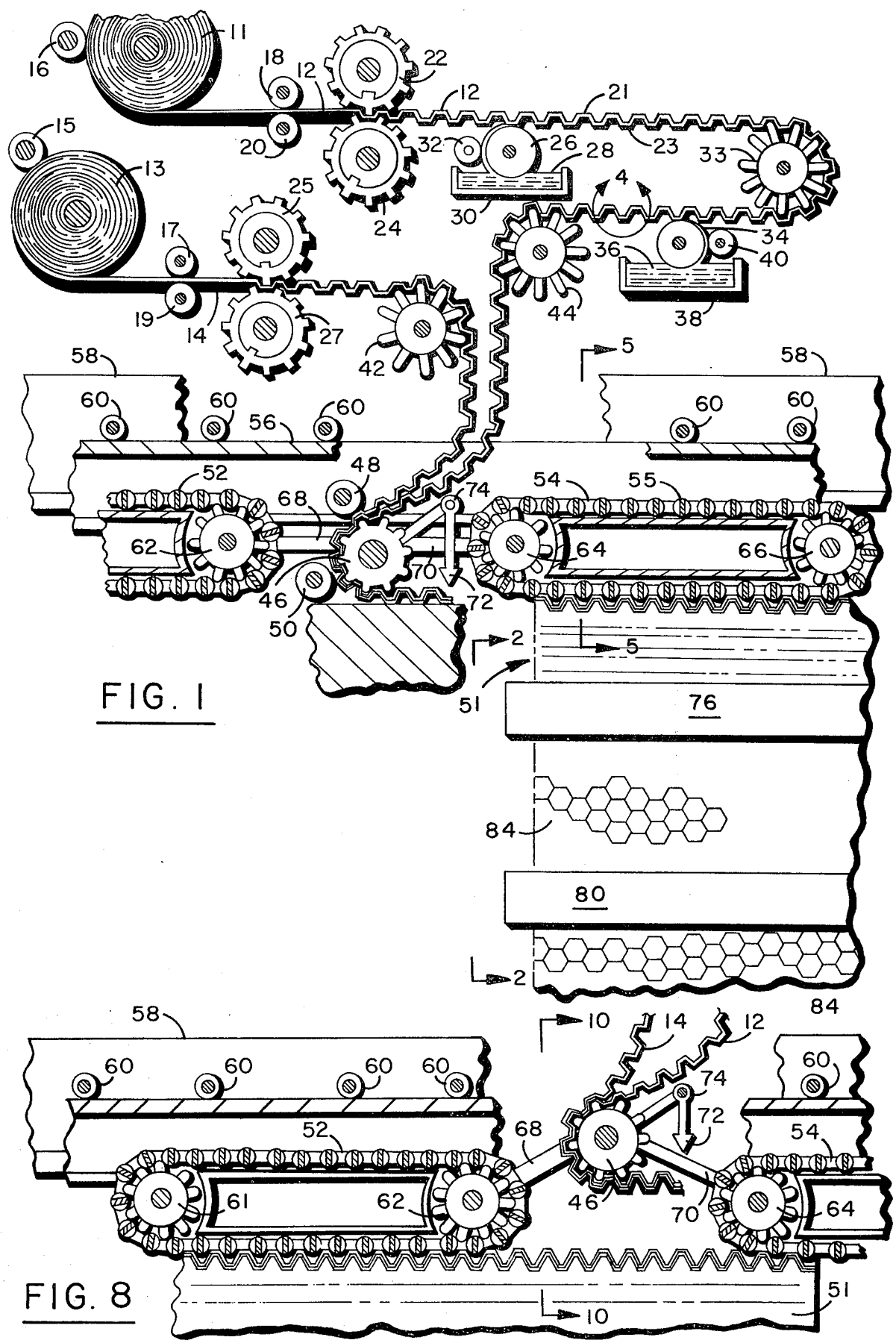
FIG. 1 shows a schematic representation of the process of the invention.
FIG. 8 shows the return stroke of the movable carriage and feeder sprocket of FIG. 1 over the stacked corrugated webs.

Referring now to FIG. 1, there is shown one web supply roll 11 which passes web 12 over feed roller 16 and guide rollers 18 and 20. From the guide rollers 18 and 20, the webbing material 12 is next corrugated by passing between spur gears 22 and 24. A similar unit corrugates web 14. Specifically, web 14 is drawn from web supply roll 13 by feed roller 15 over guide rollers 17 and 19 and then corrugated by passing between spur gears 25 and 27.

As shown, the upper corrugated web 12 having crests 21 and troughs 23, passes over coating roller 26 which picks up adhesive 28 from vessel 30. The amount of adhesive is controlled by doctor roller 32. Roller 26 applies the adhesive 28 only to the extreme outer surface of the troughs 23 of the corrugated web. The coated corrugated webbing 12 then passes over spur wheel 33, after which the extreme outer surface of the crests 21 are adhesive coated. The method of adhesive coating is the same as that previously described. Specifically, coating roller 34 picks up adhesive 36 from vessel 38, the amount of which is controlled by means of doctor roller 40, and applies it to the web. At this point, each of the outer crests 21 and the outer troughs 23 of the corrugated webbing material 12 carries a coating of adhesive. It should be noted here that the corrugated webbing 12 is adhesive coated only on the extreme outer surface of the crests 21 and of the troughs 23 while the interior of the crests and troughs remains free of adhesive coating.

While the corrugated webbing 12 is being adhesive coated, the corrugated webbing 14 issuing from spur gears 25 and 27, is being passed over spur wheel 42. After being adhesive coated, corrugated webbing 12 is then passed over spur wheel 44 where it is brought together with corrugated webbing 14.

The two corrugated webs 12 and 14 are made to pass together over sprocket 46 where guide rollers 48 and 50 align the corrugated webbing 12 and 14 respectively so that the crest and trough areas will nest one inside of another.

The two aligned corrugated webs 12 and 14 are next laid down in lengths one on top of another to form a stack 51 which is subsequently bonded in the adhesive coated areas by means of heat and pressure.

The stack 51 is formed by feeding the two nested lengths of corrugated webs 12 and 14 from right to left as shown in FIG. 1. This is accomplished by means of sprocket 46 working in conjunction with chain rollers 52 and 54. Chain rollers 52 and 54 and sprocket 46 are secured to a movable carriage 56 which is supported in a stationary member 58 by means of bearing rollers 60. Sprockets 61, 62, 64 and 66 are attached to the movable carriage 56 and provide support for chain rollers 52 and 54 respectively. Sprocket 46 is secured to the movable carriage 56 by means of support members 68 and 70 which also give support to cutting member 72.

The movable carriage 56 supporting chain rollers 52 and 54 are held in contact with the stack 51 of corrugated webs and provide pressure to the stack as well as control in aligning the corrugated areas. FIG. 5 shows an enlarged cross section of the movable carriage 56 with chain roller 54 in pressure engagement with stack 51.

Lengths of corrugated webs 12 and 14 are applied to the stack 51 by movement of the carriage 56 and chain rollers 52 and 54 to the right until the paired corrugated webbing 12 and 14 are aligned with the corrugated portions of the stack at the extreme right hand side. At this point in time, chain roller 54 has passed completely off the stack 51 while chain roller 52 maintains pressure engagement on the stack. Sprocket 46 then carries the corrugated webbing 12 and 14 from right to left as the carriage 56 moves sprocket 46 and chain rollers 52 and 54 to the left. During this feed stroke, as the carriage 56 moves to the left, chain roller 54 again comes into pressure contact with the right side of the stack 51 while chain roller 52 begins to roll off the extreme left hand side of the stack. At the end of the feed stroke, chain roller 52 is entirely beyond the stack 51; chain roller 54 is entirely pressure engaged with the stack; and sprocket 46 is off the stack. At this point, cutting member 72 shown jointed at 74 cuts the corrugated webbing material 12 and 14 precisely when the webbing material reaches the end of the stack 51. Sprocket 46 is then raised slightly to avoid engagement with the stack 51 while the movable carriage begins a return stroke to the right while providing sufficient pressure to enable engagement of chain rollers 52 and 54 with the stack.

The return stroke of the movable carriage 56 with sprocket 46 in uplifted position is shown in FIG. 8. Notice that chain roller 52 is in pressure engagement with the stack 51 while chain roller 54 is almost completely off of the stack. A cross-section showing the uplifted sprocket 46 over stack 51 is detailed in FIG. 10.

When the movable carriage 56 reaches the end of its return stroke to the right, sprocket 46 is then lowered into position to begin feeding another length of corrugated web 12 and 14 from right to left as just described. In this manner, lengths of corrugated web 12 and 14 are laid down one on top of the other in a nesting relationship to form a stack 51. During the laydown time, the roller chains 52 and 54 maintain constant pressure in the bond areas.

Figure 9:
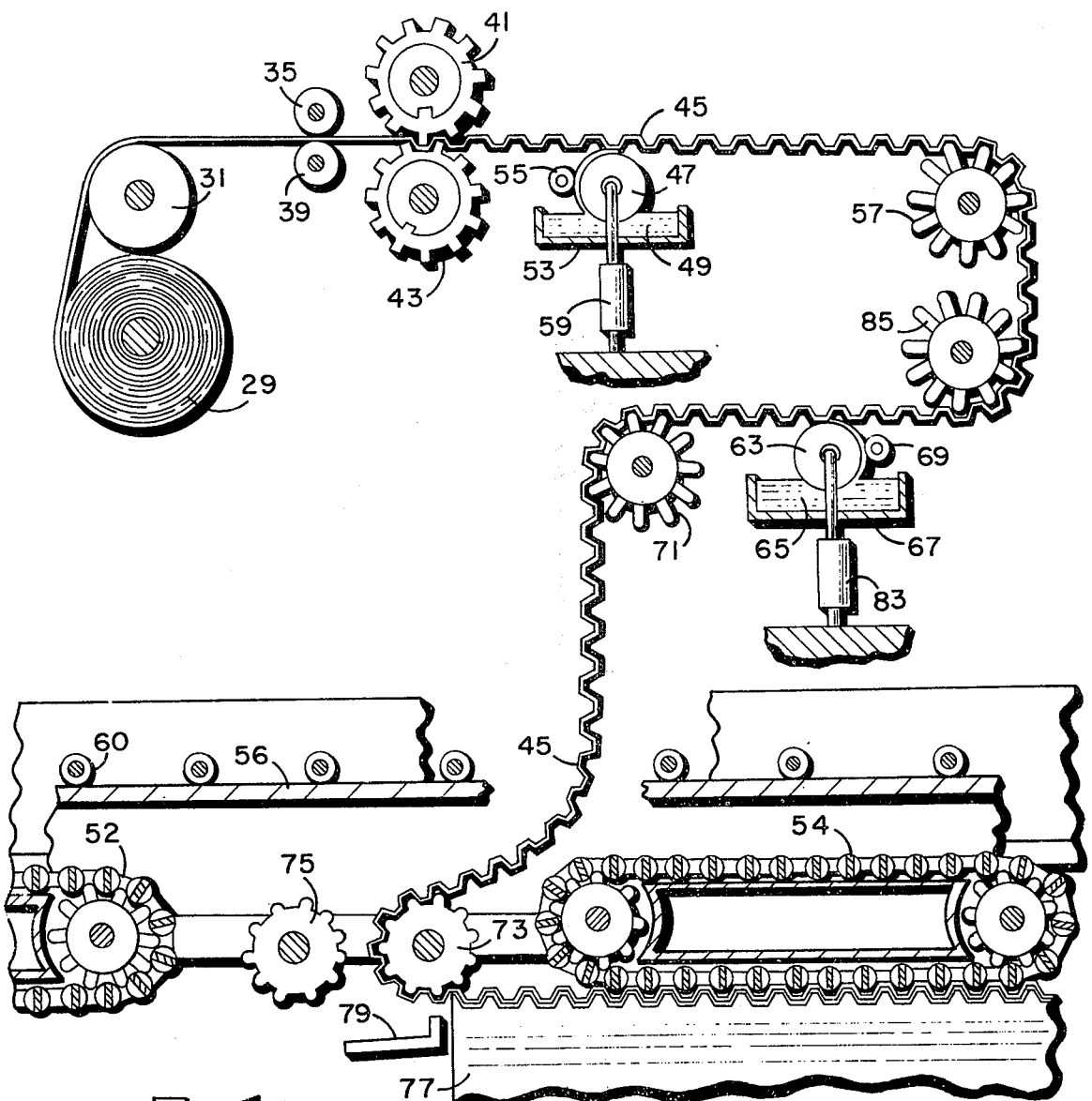
FIG. 9 shows a schematic representation of the process of the invention which is similar to FIG. 1 but utilizes one continuous length of corrugated web.

FIG. 9 shows a process similar to that illustrated in FIG. 1 except that one continuous length of web is corrugated, portions of which are alternately adhesive coated and portions left uncoated and then laid down in a continuous manner to form a stack.

As shown, web 45 issuing from web supply roll 29 is fed by feed roller 31 and guide rollers 35 and 39 to spur gears 41 and 43 where it is corrugated. Alternate predetermined lengths of corrugated web corresponding to the length of the stack 77, to be formed, are then adhesive coated. This is accomplished by passage of corrugated web 45 first over coating roller 47 which picks up adhesive 49 held by vessel 53. The amount of adhesive is controlled by doctor roller 55. After passage over sprocket wheels 57 and 85, which is in the position shown in the drawing, the opposite side of the corrugated web is coated in the same manner; that is, coating roller 63 applies adhesive 65 held in vessel 67, the thickness of the adhesive being controlled by means of doctor roller 69.

As shown, each of the coating rollers 47 and 63 are attached to a hydraulic lift 59 and 83 respectively. When adhesive coating of a length of corrugated web 45 is desired, the lifts 59 and 83 are in the extended position as shown in FIG. 9. When it is desired to avoid adhesive coating of a portion of corrugated web 45, the hydraulic lifts 59 and 83 are simply lowered, bringing the attached coating rollers 47 and 63 out of contact with the web 45. This process is repeated as desired to create alternate but continuous lengths of adhesive coated and uncoated corrugated web 45. These are then laid down to form a stack 77.

The coated and uncoated portions of web 45 pass over sprocket wheel 71 to either sprocket 73 or 75 depending on the direction of feed. As shown in FIG. 9, sprocket 73 has just completed feeding a length of web 45 from right to left across the stack 77. Sprocket 75 will then be moved to the right to begin laying down another portion of web 45 to the stack. A restraining finger 79 is slipped briefly into the foldover area at the edge of the stack 77 until the sprocket 75 and pressure roller 52 can bond the fold area together. Another restraining finger 81 located at the right of the stack performs the same function for folds at the right edge of the stack 77 as shown in FIG. 12.

The above described method requires less equipment than the process of FIG. 1. Furthermore, web feed to the stack is continuous so that time is not wasted in a return stroke necessary to the process of FIG. 1, when no web is laid down. However, honeycomb produced by either method possesses comparable properties.

Figure 2:
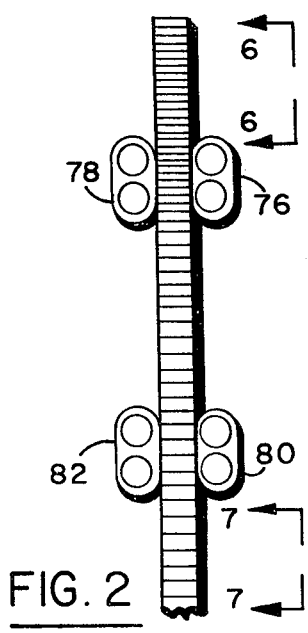
FIG. 2 shows a cross-section of stacked honeycomb taken on the lines 2—2 of FIG. 1.

Expansion of the stack 51 or 77 in a continuous manner to form the honeycomb cells is effected for both methods by means of continuous belts 76 and 78, and 80 and 82, shown in FIGS. 1, 2 and 8. Continuous belts 76, 78, 80 and 82, grip the sides of the stack 51 or 77 to hold the surfaces level and to support the stack while bonding pressure is being applied by roller chains 52 and 54 to the top of the stack. In addition, belts 76, 78, 80 and 82 apply curing heat to aid in the cure of the adhesive coatings 37 in the bond areas. Continuous belts 80 and 82 operate at a very much greater speed than continuous belts 76 and 78, thereby pulling the bonded webs apart so that the area of the stack 51 issuing from continuous belts 76 and 78 immediately expands. The resulting honeycomb open structure 84 is illustrated at the bottom of FIG. 1 and enlarged in FIG. 7.

FIGS. 4, 6 and 7 show enlarged detail of the webbing material 12 and 14 in various stages of the honeycomb manufacture.

Figure 11:
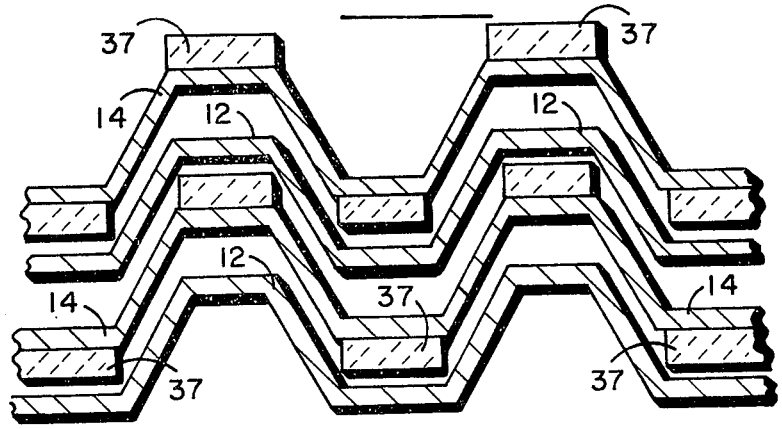
FIG. 11 shows the stacked corrugated webs of FIG. 6 with the layers separated to show the relationship between adhesive coated and uncoated webs; and, FIG. 12 shows the movable carriage of FIG. 9 feeding web from right to left.

In FIG. 4 there is shown corrugated webbing 12 carrying a coating of adhesive 37 on the extreme outer surface of the crest areas and the extreme outer surface of the trough areas. The interior of the crest and trough portions are left free of adhesive. This last fact is very important in the resulting structure in the bonded stack which is made up of a layer of adhesive coated corrugated webbing 12 alternating with a layer of uncoated corrugated webbing 14, as shown in detail in FIG. 6. The layers of adhesive coated and uncoated webs are shown slightly separated in FIG. 11, to more clearly illustrate the invention method.

It is important to notice that the adhesive coatings are found only at the highest and lowest surfaces of the crest and trough areas. The side surfaces of the crest and trough areas must be substantially free of adhesive to permit expansion of the stack to form the open honeycomb structure shown in FIG. 7. At the same time, the adhesive coating thickness shall be sufficient to fill the voids that occur at the crests of corrugated webs when they are nested together tightly. Thus, the adhesive coating must be thick enough to push one crest down into contact with the one below it. For a hexagonal cell shaped honeycomb, the adhesive coating thickness should be about twice the web thickness. For other honeycomb cell shapes, the thickness of the adhesive can readily be determined empirically.

Referring to FIG. 6 of the drawing, it is apparent that in the bonded stack of corrugated webs, each of the crest areas and each of the trough areas has a coating of adhesive which alternates with two layers of corrugated webs, and that each of the adhesive coatings in the crest areas is offset by one layer of corrugated web in the trough areas.

The bonded stack of corrugated webs as shown in FIG. 6 is preferably made by the methods which are described and illustrated by the drawings 1 through 12. However, the bonded stack of corrugated web as shown in FIG. 6 can be produced by other methods as well. For example, in lieu of adhesive coating only the extreme outer surface of the crest areas and the extreme outer surface of the trough areas, the extreme inner surface of the crest areas and the extreme inner surface of the trough areas of one length of corrugated web can be adhesive coated and alternated with uncoated lengths of corrugated webs to form the stack as shown in FIG. 6. While this method is perfectly suitable, it is less preferred because it is more difficult to control the application of the adhesive coatings precisely to the extreme inner surfaces of the trough and crest areas.

By still another method, the extreme outer crest surfaces of one length of corrugated webbing can be adhesive coated and alternated in a stack with a length of corrugated webbing having only the extreme inner surfaces of the trough areas adhesive coated. It is important in this latter method to have the adhesive coatings facing in the same direction. It can also be seen that the same method can be described as adhesive coating only the extreme outer surface of the trough areas of one length of corrugated webbing and alternating it in a stack with a length of corrugated webbing having only the extreme inner surface of the crest areas adhesive coated. In effect, the entire stack would be turned upside down.

Expansion of the bonded stacked webbing produced according to the additional methods described above would be the same as for that described in the preferred method.

As shown in FIG. 6, in the resulting stack 51 each bonded area alternates with an unbonded area so that upon expansion, as shown in FIG. 7, the unbonded areas open up to form the open hexagonal honeycomb structure 84.

FIGS. 1, 8 and 9 as described above, illustrate the continuous production of honeycombs having a hexagonal structure. It should be noted however, that the invention is not limited to the production of honeycombs having a hexagonal structure. Other types of honeycomb structure having varied cell size and shape are known and can also be formed according to the process of the invention. As an example, FIG. 3 illustrates one such honeycomb structure, which can be formed. FIG. 3 shows another type of honeycomb structure having a generally square or diamond shaped cell which can be produced according to the invention by using corrugated webbing having a generally zigzag pattern 90 with bond areas designated at 92. The type shown in FIG. 3 is intended to be illustrative of one of various types which can be employed.

Various types of web material are commonly used in the production of honeycombs. Those most commonly used at the present time are kraft paper, aluminum foil, and polyamide. The invention however, is intended to cover all types of webbing material, such as for example, those selected from the group consisting of films, sheets, fabrics, mats and foils, which are derived from natural and synthetic fibers, plastics, glass, metals, and combinations thereof.

Various types of adhesive coatings can be used to bond the corrugated webs together. Examples of adhesive coatings which can be used include those based on phenolics, melamines, polyesters, epoxies, silicones, and mixtures thereof. The choice of an adhesive coating will depend upon the type of webbing material which is used as well as the conditions required for the ultimate use of the honeycomb cores.

Various modifications of the invention are contemplated and can be resorted to by those skilled in the art without departing from the spirit and scope of the invention as defined by the following claims.

I claim:

1. A process for the manufacture of honeycomb comprising:
   corrugating a web material to form alternating crest and trough areas;
   applying adhesive coatings to the corrugated webs and forming a stack of said adhesive coated webs so that said crest and trough areas are in substantial nesting alignment;
   applying said adhesive coatings only to the extreme outer surfaces of the crests and to the extreme outer surface of the troughs of alternate layers of the corrugated web materials; said stack being formed by alternating layers of adhesive coated and uncoated corrugated webs;
   allowing the adhesive coatings to cure and bond the stacked webs together; and,
   expanding said bonded webs to form an open celled honeycomb structure.

2. A process as claimed in claim 1 wherein:
   heat and pressure are applied to the stacked webs while allowing the adhesive coatings to cure.

3. A process as claimed in claim 2 wherein:
   said adhesive coatings are heat curable and wherein heat and pressure are applied to the stacked layers of web to cure the adhesive coatings; and,
   wherein said expansion of said bonded stack is effected by providing a pulling force to the outermost web layers.

4. A process as claimed in claim 3 wherein:
   said expansion is achieved by first compressing the bonded stacked webs against gripping belts followed by applying a pulling pressure on said bonded stacked webs by means of another pair of gripping belts.

5. A process as claimed in claim 1 wherein:
   alternate substantially equal length portions of a continuous length of corrugated web are adhesive coated on the extreme outer surface of the crest areas and the extreme outer surface of the trough areas; and,
   wherein said stack is formed by continously laying down said corrugated web by alternating an adhesive coated portion of web with an uncoated portion of web; and,
   further applying heat and pressure to the stacked webs while allowing the adhesive coating to cure.

6. A process as claimed in claim 4 wherein:
   said process is continuous.

7. A process for the manufacture of honeycomb comprising:
   corrugating a web material to form alternating crest and trough areas; applying adhesive coatings to the corrugated webs and forming a stack of said adhesive coated webs so that said crest and trough areas are in substantial nesting alignment;
   said adhesive coatings are applied only to the extreme inner surface of the crests and to the extreme inner surface of the troughs of alternate layers of corrugated web material;
   said stack is formed by alternating layers of adhesive coated and uncoated webs; and,
   further comprising applying pressure to the stacked webs while allowing the adhesive coating to cure, expanding said bonded webs to form an open celled honeycomb structure.

8. A process for the manufacture of honeycomb comprising:
   corrugating a web material to form alternating crest and trough areas, applying adhesive coatings to the corrugated webs and forming a stack of said adhesive coated webs so that said crest and trough areas are in substantial nesting alignment;
   said adhesive is applied only to the extreme outer surface of the crests of one layer of corrugated web and said adhesive is applied only to the extreme inner surfaces of the troughs of another layer of corrugated web; and,
   wherein the layers of web are stacked together by alternating an outer crest coated web with an inner trough coated web, so that the adhesive coatings all face in the same direction; and,
   applying pressure to the stacked webs while allowing the adhesive coatings to cure, expanding said bonded webs to form an open celled honeycomb structure.

* * * * *